Aug. 6, 1940.   J. E. BERGSTRÖM   2,210,137
CENTERLESS GRINDING MACHINE
Filed Aug. 4, 1937
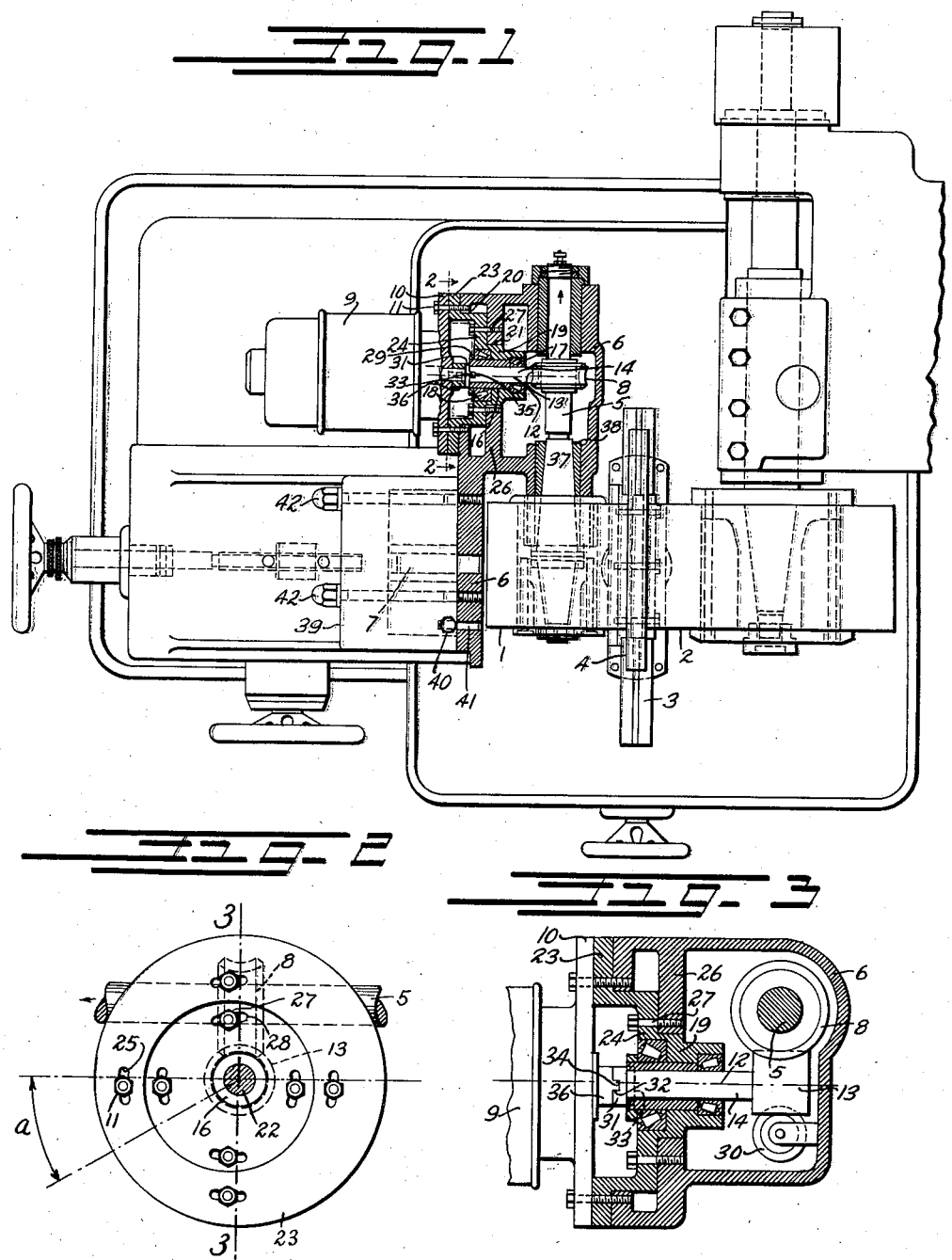
INVENTOR:
JOHAN ERIK BERGSTRÖM
BY Haseltine, Lake & Co.
ATTORNEYS Patented Aug. 6, 1940

2,210,137

UNITED STATES PATENT OFFICE 2,210,137

CENTERLESS GRINDING MACHINE

Johan Erik Bergström, Halmstad, Sweden

Application August 4, 1937, Serial No. 157,273
In Sweden August 17, 1936

1 Claim. (Cl. 51—103)

The present invention relates to centreless grinding machines of the kind in which the work is fed forwards during the grinding operation between a grinding wheel rotatable about a horizontal axis, and a rotatable regulating wheel, the axis of which is adjustably inclined with relation to the axis of the grinding wheel for regulating the work feed and is more particularly concerned with machines in which the grinding wheel and the regulating wheel are driven by separate motors and in which the motor of the regulating wheel, the regulating wheel itself and the interconnecting gearing are mounted on a pivotal supporting plate, frame or the like.

The invention relates more particularly to improvements in driving means for the regulating wheel where the latter is geared to the driving motor by means of a worm gear drive, the essential object in view being to develop an arrangement that facilitates the mounting of the driving means for the regulating wheel and at the same time allows the elimination of any excessive play between the worm and the worm wheel and makes possible subsequent adjustments of the worm in relation to the worm wheel to take up wear of said members so that no lost motion will occur between the said members, which is of great importance for obtaining a well-ground product of superior accuracy.

The arrangement according to the invention resides in journalling the motor-driven shaft on which the driving worm is secured, in a bushing or the like which is pivotally mounted about an axial line which is eccentric in relation to the motor-driven shaft so that by turning said bushing about said axis the distance between the motor-driven shaft and the shaft of the worm wheel on which the regulating wheel is mounted may be adjusted at will.

According to a further feature of the invention, when the shaft of the regulating wheel is journalled in a conical bearing, the above referred to eccentric journalling of the bushing is so arranged with relation to the motor shaft that, when turning the bushing to eliminate lost motion between the worm and the worm wheel, the worm will exert a pressure upon the worm wheel which is so directed that it tends to move the shaft of the regulating wheel in a direction such that the journalling of the latter shaft in the conical bearing will be maintained free from play.

A constructional embodiment of the invention will now be described by way of example with reference to the accompanying drawing in which:

Fig. 1 is a plan view, partly in horizontal section, of a centreless grinding machine according to the invention, while Fig. 2 is a vertical section along the line II—II in Fig. 1, and Fig. 3 is a longitudinal section along the line III—III in Fig. 2, the eccentric arrangement of the screws in each of these figures being shown somewhat exaggerated for the sake of clarity.

Referring first to Fig. 1, reference numeral 1 designates the regulating wheel and 2 the grinding wheel, between which the work 4, while resting on the work-rest slide 3, is fed forwards in known manner by giving the regulating wheel an axially inclined position in relation to the grinding wheel. The regulating wheel 1 and its driving motor 9 are both mounted on the same supporting frame or plate 6. 39 denotes a slide displaceable along the main machine frame. The supporting frame or plate 6 together with the motor 9, the regulating wheel and driving mechanism for the latter are pivotally mounted as a whole on the slide 39 about a horizontal pivot shaft 7 so that the regulating wheel will be pivotable in a vertical plane parallel with the direction of feed of the work and may be adjusted to occupy different inclined positions with relation thereto. The rocking of the frame 6 about the shaft 7 may be effected by means of a screw 40 threaded into the slide 39 and having its end abutting against a pin 41 secured to the frame or plate 6. The latter plate may be locked to the slide 39 after adjustment by means of bolts 42.

The regulating wheel 1 is secured to the shaft 5 suitably journalled in the frame or plate 6. The regulating wheel and the shaft 5 are so arranged that the horizontal pivot shaft 7 is situated in the central plane of the regulating wheel perpendicular to its axis 5 and, if extended, will intersect the said axis at right angles. The point of intersection will thus be the exact centre of the regulating wheel and it will be readily understood that when the frame 6 is turned about the pivot shaft 7 to different positions, the centre of the regulating wheel will always be maintained in an unchanged position.

A worm wheel 8 is secured to the shaft 5 while the motor 9 is secured to the frame or plate 6 by means of a flange 10 and screws 11. A motor shaft indicated generally at 12 carries a worm 13 in mesh with the worm wheel 8. The motor shaft is made in two parts 14 and 15 which are interconnected by means of a coupling that permits a vibrationless running while allowing the shaft parts 14 and 15 to lie eccentric to one another.

As shown the shaft portion 14 carrying the worm 13 is connected to the motor portion 15 of the shaft by means of a loose coupling member 31 which is provided on opposite sides with grooves 32 and projections 33 arranged at right angles to each other and which engage complementary projections 34 and grooves 35 on the respective shaft portions 15 and 14. In the construction shown in the drawing, the projections 34 are provided on a sleeve 36 keyed to the shaft portion 15.

A further sleeve 16 is secured to the shaft portion 14 which is journalled, as illustrated, in a bushing 19 by means of conical roller bearings 17 and 18. The bushing 19 is mounted in the supporting frame or plate 6 on two concentric cylindrical sliding surfaces 20 and 21, which are, however, eccentric with relation to the motor shaft 12. Reference numeral 22 (Fig. 2) designates the axial line of the surfaces 20 and 21, being situated somewhat to one side of the motor shaft 12. The bushing 19 is provided with a flange 23 which is concentric with the motor shaft 12 and is secured between the flange 10 of the motor and the frame 6 by means of the screws 11 which pass through elongated arcuate holes 25 (Fig. 2) in the flange 23. These holes 25 are curved concentrically about the axis 22 and are thus eccentrically arranged in the flange 23. The bushing 19 is also secured to a partition wall 26 provided with the bearing surface 21 in the supporting frame 6 by means of screws 27 passing through similar elongated holes 28 in the wall 24 of the bushing, said holes being also curved concentrically about the axis 22.

When the worm 13 is to be adjusted with relation to the worm wheel 8, the screws 11 are first extracted, whereupon the motor can be removed. The screws 27 are then loosened, whereupon the bushing 19 may be turned due to the provision of the elongated holes 28. During this turning of the bushing the centre of the shaft portion 14 is moved along a circular path having the axis 22 as a centre and by bringing the shaft portion 14 towards the shaft 5, any play caused by wear can be eliminated. The bushing is turned until it is felt by the hand that a suitable play between the worm and the worm wheel has been provided. In doing so, it is convenient to rock the sleeve 16, secured to the shaft portion 14, backwards and forwards by means of the nut 29 which is secured to the sleeve 16 by a locking screw (not shown). When the desired adjustment has been made, the screws 27 are tightened, the motor is re-fitted in its plate and the screws 11 tightened.

When turning the bushing 19 so that the lost motion between the worm and the worm wheel is eliminated, the worm will exert a pressure upon the worm wheel 8 which tends to displace the shaft 5 of the regulating wheel in an axial direction. When said shaft, as shown, is provided with a conical journal 37 running in a conical bearing 38, said axial pressure must not be in such a direction that it tends to create play between the journal 37 and the bearing 38, on the contrary it should have such a direction that it tends to move the shaft 5 in a direction to maintain the journalling of the shaft without play in the bearing 38, i. e. the pressure should be directed outwards in the direction of the arrow shown in Figs. 1 and 2. This action is obtained by so arranging the eccentric mounting of the bushing 19 with relation to the motor shaft that the motor shaft 12 when turned about the axis 22, as described above, is moved outwards in the direction of the arrow simultaneously with its being brought nearer to the shaft 5. According to Fig. 2 the axis 22 of the bushing 19 is located below and on the outer side of the shaft 12 relatively to the regulating wheel. It is suitable to locate the axis 22 on a radial line through the axis 12 making an angle $\alpha$ with the horizontal plane equal to about 30°.

An adjustment for the wear in the conical roller bearings 17 and 18 may also be readily effected by loosening the locking screw (not shown) of the nut 29 and turning the latter until the desired amount of play in the bearings is restored.

The lubrication of the worm is effected by means of a dipping wheel 30 running in a bath of lubricating oil in the bottom of the gear housing.

Having now particularly described the nature of my invention and the manner of its operation what I claim is:

A centreless grinding machine, comprising a machine frame, a grinding wheel, a rotatable regulating wheel adapted to roll against a side of the work opposite to that of the grinding wheel, the shaft of the regulating wheel being arranged in a plane parallel to the shaft of the grinding wheel, a work-rest supporting the work from below while being ground, driving means for the grinding wheel, a separate electrical motor driving the regulating wheel, a housing in which the regulating wheel and its driving motor both are mounted and their shafts journalled, said housing being pivotally mounted and adapted to adjust the axis of the regulating wheel to inclined positions in relation to the axis of the grinding wheel in a plane parallel with the direction of feed of the work; a worm secured to the shaft of said driving motor in mesh with a worm wheel secured to the shaft of the regulating wheel, the shaft of said driving motor being journalled in a bushing pivotally mounted in said housing about an axial line, which is eccentric with relation to the motor shaft so that by turning said bushing about said axis the distance between the motor shaft and the shaft of the regulating wheel may be adjusted to eliminate dead motion between the worm and the worm wheel, said shaft of the regulating wheel being journalled in a conical journal bearing, and the eccentric mounting of said bushing with relation to the motor shaft being so arranged that, when the bushing is turned to eliminate lost motion between the worm and the worm wheel, the worm will exert a pressure upon the worm wheel which tends to move the shaft of the regulating wheel in a direction such that the journalling of the latter shaft in its conical bearing will be maintained free from play.

JOHAN ERIK BERGSTRÖM.